(12) United States Patent
De Armas et al.

(10) Patent No.: US 10,122,598 B2
(45) Date of Patent: Nov. 6, 2018

(54) SUBSCRIPTION WATCH LISTS FOR EVENT HANDLING

(75) Inventors: Mario E. De Armas, Wellington, FL (US); Steve Groeger, Dorset (GB); Andrew M. Leonard, Winchester (GB); Stephen Rea, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 13/557,651

(22) Filed: Jul. 25, 2012

(65) Prior Publication Data

US 2014/0032739 A1    Jan. 30, 2014

(51) Int. Cl.
G06F 15/173    (2006.01)
H04L 12/26    (2006.01)
G06F 9/54    (2006.01)

(52) U.S. Cl.
CPC .............. H04L 43/04 (2013.01); G06F 9/542 (2013.01)

(58) Field of Classification Search
CPC .............. G06F 9/542; G06F 17/30368; G06F 17/30607; G06F 17/30867; G06F 2201/86; G06F 2201/865; G06F 11/30; G06F 11/327; G06F 17/3051
USPC ...................................................... 709/224
See application file for complete search history.

(56) References Cited

U.S. PATENT DOCUMENTS

| | | | |
|---|---|---|---|
| 5,721,825 A | 2/1998 | Lawson et al. | |
| 5,999,978 A | 12/1999 | Angal et al. | |
| 7,434,229 B2 | 10/2008 | Barinov et al. | |
| 7,765,293 B2 * | 7/2010 | Adams et al. | 709/224 |
| 2005/0149533 A1 * | 7/2005 | El-Shimi et al. | 707/10 |
| 2006/0070083 A1 | 3/2006 | Brunswig et al. | |
| 2006/0143275 A1 | 6/2006 | Stephens et al. | |
| 2007/0050392 A1 | 3/2007 | Shukla et al. | |
| 2007/0094346 A1 * | 4/2007 | Nussey | G06F 17/30867 709/217 |
| 2007/0250545 A1 | 10/2007 | Surlaker et al. | |
| 2008/0072240 A1 * | 3/2008 | Gschiermeister | G06F 9/542 719/316 |
| 2008/0184266 A1 | 7/2008 | Bornhoevd et al. | |
| 2009/0254601 A1 * | 10/2009 | Moeller et al. | 709/201 |

(Continued)

OTHER PUBLICATIONS

Chakravarthy, S., Active Database Architectures and the Design of Sentinel for Constraint Management, Florida Univ., Gainesville. Dept. of Comp. Science, Mar. 1992-Oct. 1993.

*Primary Examiner* — Douglas B Blair
*Assistant Examiner* — Imran Moorad
(74) *Attorney, Agent, or Firm* — Steven M. Greenberg, Esq.; CRGO Law

(57) ABSTRACT

The present invention provides a method, system and computer program product for watch list oriented processing of events in a multi-object event data processing system. In an embodiment of the invention, a method for watch list oriented processing of events in a multi-object event data processing system, can include pre-processing a set of subscriptions against a pool of objects monitored for events in the data processing system to produce a watch list of objects. The method further can include receiving events in the data processing system corresponding to different ones of the objects in the pool of objects. The method yet further can include comparing the received events to the watch list to determine which events pertain to objects referenced in the watch list.

6 Claims, 2 Drawing Sheets

(56) References Cited

U.S. PATENT DOCUMENTS

2010/0281150 A1\* 11/2010 Sailhan et al. ................ 709/223
2010/0332277 A1   12/2010 Dentzer et al.
2014/0032694 A1\*  1/2014 Cohn et al. ................... 709/207

\* cited by examiner

SUBSCRIPTION WATCH LISTS FOR EVENT HANDLING

BACKGROUND OF THE INVENTION

Field of the Invention

The present invention relates to event driven data processing and more particularly to a subscription notification framework providing event handling and event notification dependent upon event subscriptions.

Description of the Related Art

In computer programming, event-driven programming or event-based programming is a programming paradigm in which the flow of the program is determined by events such as sensor outputs or user actions including mouse clicks and key presses, or messages from other programs or threads of execution. Event-driven programming can also be defined as an application architecture technique in which the application has a main loop which is clearly divided down to two sections—the first being event selection or event detection and the second being event handling. Event driven data processing differs from event driven programming in that in event driven data processing, actions taken in response to events need not be program flow actions, but merely any programmatic action including those actions as simple as merely recording the occurrence of a detected event.

Event driven data processing can range from single object event handling in which all events relate to the subject of a single programmatic object, to multi-object event handling in which different events relate to different subjects of respectively different programmatic objects. In traditional single object event driven data processing, events are detected and passed into an event loop and within the event loop, each event is matched to a handler and processed accordingly. In more complex multi-object event driven data processing, different subscriptions can be managed for different objects such that subscribers receive events for handling only when the events pertain to objects for which the subscriber has subscribed. Thus, for each received event, first a corresponding object must be determined for which the event pertains, second, only those subscriptions pertaining to the corresponding object are selected, and third, the selected subscriptions receive notification of the event.

In the multi-object event data processing context, two common methodologies for processing events are preferred. In a first methodology, events are processed essentially in real time sequentially as the events occur. As such, the processing of events in sequence can be resource intensive computationally speaking as the subscriptions for the events first must be determined before providing notice of the events to the subscribers corresponding to the determined subscriptions. In a second methodology, events are processed in batch mode so as to avoid taxing computing resources at less than desirable times of the day. However, in processing events in batch mode, the timely handling of events can be compromised in exchange for the reduction in resource consumption.

BRIEF SUMMARY OF THE INVENTION

Embodiments of the present invention address deficiencies of the art in respect to multi-object event data processing and provide a novel and non-obvious method, system and computer program product for watch list oriented processing of events in a multi-object event data processing system. In an embodiment of the invention, a method for watch list oriented processing of events in a multi-object event data processing system, can include pre-processing a set of subscriptions against a pool of objects monitored for events in the data processing system to produce a watch list of objects. The method further can include receiving events in the data processing system corresponding to different ones of the objects in the pool of objects. The method yet further can include comparing the received events to the watch list to determine which events pertain to objects referenced in the watch list. Finally, for each one of the received events, a notification can be forwarded to one or more subscribers corresponding to an object in the watch list matching an object implicated by the one of the received events.

In another embodiment of the invention, a multi-object event data processing system can be configured for watch list oriented processing of events. The system can include a host computing system that includes at least one computer with memory and at least one processor. The system also can include a pool of objects monitored for events disposed in the memory of the host computing system. The system additionally can include a watch list generation module executing in the memory of the host computing system to pre-process a set of subscriptions against the pool of objects to produce a watch list of objects in the memory of the host computing system. Finally, the system can include an event loop executing in the memory of the host computing system. The loop can receive events corresponding to different ones of the objects in the pool of objects, compare the received events to the watch list to determine which events pertain to objects referenced in the watch list, and for each one of the received events, forward a notification to one or more subscribers corresponding to an object in the watch list matching an object implicated by the one of the received events.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for watch list oriented processing of events in a multi-object event data processing system. In accordance with an embodiment of the invention, a list of subscription rules can be applied to a set of objects for which events are generated in a computing environment. The application of the subscription rules can produce a watch list of objects and corresponding subscribers. Thereafter, as events are generated in respect to the set of objects, for each event, an object corresponding to the event can be compared to the watch list of objects to determine whether or not the event is to be routed to one or more subscribers associated with those entries in the watch list matching the object corresponding to the event. In this way, the resource consumption resulting from the application of the rules can occur prior to the processing of the events thereby permitting sequential processing of the events without the concurrent corresponding resource consumption.

Figure 1:
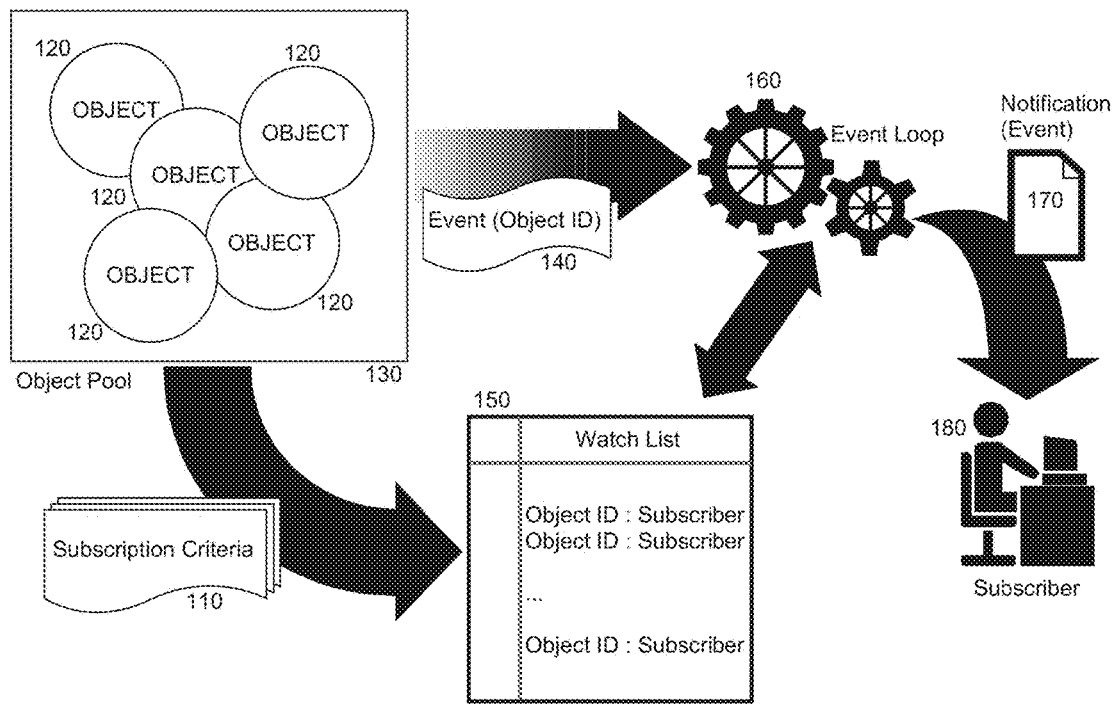
FIG. 1 is a pictorial illustration of a process for watch list oriented processing of events in a multi-object event data processing system.

In further illustration, FIG. 1 is a pictorial illustration of a process for watch list oriented processing of events in a multi-object event data processing system. As shown in FIG. 1, subscription criteria 110 for different event subscriptions can be processed on behalf of different subscribers against an object pool 130 of objects 120 in order to produce a watch list 150 of records specifying different objects and corresponding subscribers. Thereafter, an event 140 associated with one of the different objects 120 of the object pool 130 can be received in an event loop 160. The event loop 160 in turn can compare the object 120 associated with the event 140 with the watch list 150 to identify one or more interested subscribers 180. Finally, the subscribers 180 can receive notification 170 of the event 140.

Figure 2:
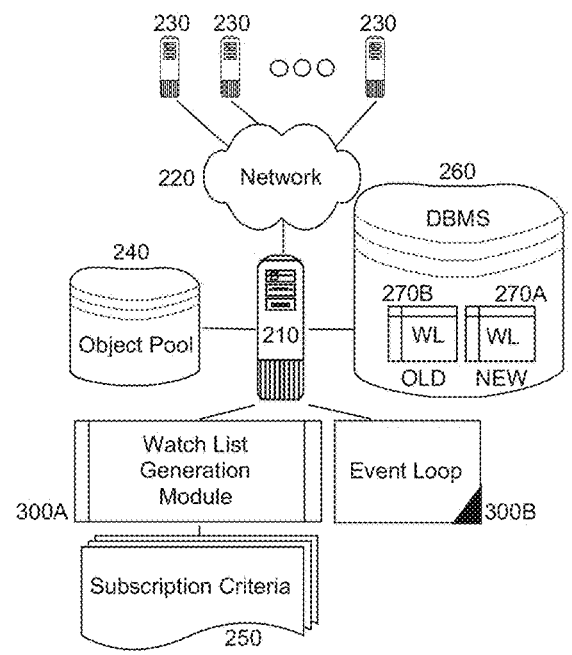
FIG. 2 is a schematic illustration of a multi-object event data processing system configured for watch list oriented processing of events; and, FIG. 3 is a flow chart illustrating a process for watch list oriented processing of events in a multi-object event data processing system.

The process described in connection with FIG. 1 can be implemented within a multi-object even data processing system. In further illustration, FIG. 2 schematically shows a multi-object event data processing system configured for watch list oriented processing of events. The system can include a host computing system 210 that can include one or more computers each with at least one processor and memory. The host computing system 210 can be configured for communicative coupling to different remote computing devices 230 over computer communications network 220.

The host computing system 210 can be coupled to a data store of objects 240 representative of different resources of the host computing system 210, such as different software components, or different physical device elements. A watch list generation module 300A can execute in the memory of the host computing system 210 to construct a watch list 270A, 270B based upon subscription criteria 250 for subscriptions to events detected in association with the different objects represented in the data store of objects 240. The watch lists 270A, 270B can include different records for different objects to which different subscribers have subscribed according to the subscription criteria. Each record in the watch lists 270A, 270B can include an object key for an object to which a subscriber has subscribed to receive notifications of events, and the corresponding subscriber. Optionally, the object key can be a hash value of the object.

In one aspect of the embodiment, the watch list generation module 300A can produce a watch list 270A for a contemporaneous set of objects represented by the data store of objects 240 and can re-designate a previous watch list 270B for a previous set of objects previously represented by the data store of objects 240. Further, both watch lists 270A, 270B can be cached in a database 260. Finally, an event loop 300B can execute in the host computing system 210.

The event loop 300B can include computer readable program code that when executed in the memory of the host computing system 210 can process events received in the host computing system to identify corresponding objects. The program code further can compute hash values for each identified object and can individually compare those hash values to the object keys of the watch lists 270A, 270B. For each matching record in the watch lists 270A, 270B a subscriber can be identified and the program code of the event loop 300B can route notification of a corresponding event to the identified subscriber. In this way, the event processing of the events in the event loop 300B can proceed without experiencing the resource intensive processing of the subscription criteria 250.

Figure 3:
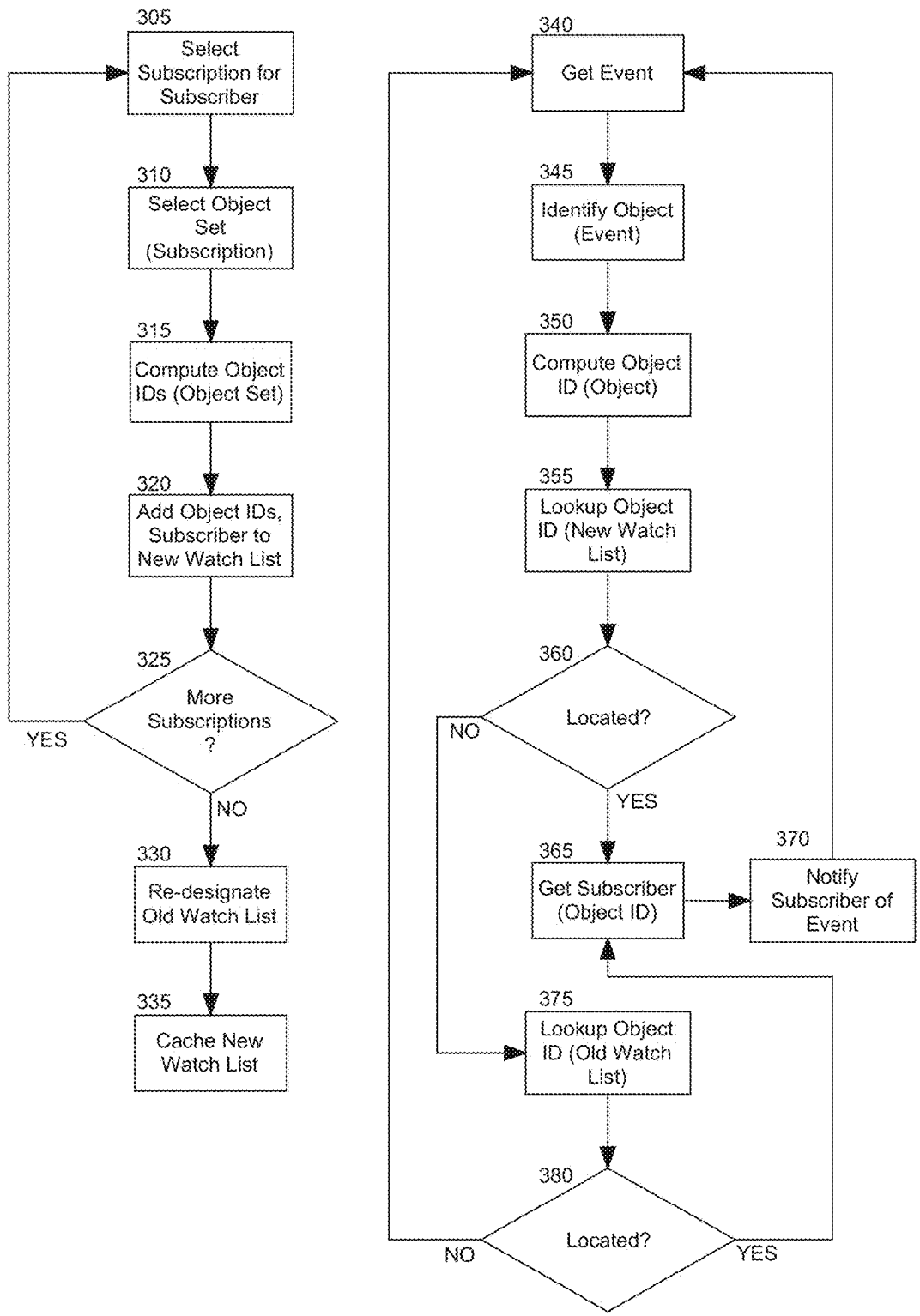

In even yet further illustration of the operation of the watch list generation module 300A and the event loop 300B, FIG. 3 is a flow chart illustrating a process for watch list oriented processing of events in a multi-object event data processing system. First in reference to the watch list generation module 300A, beginning in block 305, a subscription to object events for a subscriber can be selected and an object set of one or more objects computed for the subscription. In block 315, a key value can be computed for each object in the object set and in block 320 one or more records can be written to a new watch list for each of the objects in the object set with a corresponding key value for the objects. In decision block 325, if more subscriptions remain to be processed, the process can repeat through block 305. In decision block 325, if no further subscriptions remain to be processed, in block 330 the prior watch list cached in a database can be re-designated from the new watch list to the old watch list and in block 335, the new watch list can be cached in the database.

The process described in connection with blocks 305 through 335 can be performed periodically according to a schedule to account for changes in the composition of the object pool. In this regard, the old and new watch lists cached in the database can reflect an old state of the object pool and a contemporaneous state of the object pool, respectively.

Now considering the operation of the event loop 300B, in block 340 an event can be received in connection with an object. In block 345 the object associated with the event can be identified and in block 350, a key can be computed for the identified object. In block 355 the new watch list can be accessed with a lookup on the key. In decision block 360, if a record is located with the key, in block 365 a corresponding subscriber can be retrieved and in block 370 notification of the event can be transmitted to the subscriber. In decision block 360, however, if a record is not located, in block 375 the old watch list can be consulted to determine if the object existed in the old watch list, but not the new watch list. In block 380, if the object is located in the old watch list, again in block 365 a corresponding subscriber can be retrieved and in block 370 notification of the event can be transmitted to the subscriber.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A multi-object event data processing system configured for watch list oriented processing of events, the system comprising:
a host computing system comprising at least one computer with memory and at least one processor;
an event loop executing in the host computing system and receiving events in the event loop;
a pool of objects monitored for events received in the event of the host computing system;
a watch list generation module executing in the memory of the host computing system to produce an occurrence of resource consumption resulting from an application of subscription rules prior to processing the received events in the event loop and permit sequential processing of the received events in the event loop without concurrent corresponding additional resource consumption by:
pre-processing prior to a receipt of events occurring in connection with different objects a set of subscriptions against the pool of objects by applying a set of subscription rules for different ones of the subscriptions to the objects in the pool before processing the received events, the application of the rules producing a watch list of objects and corresponding subscribers based upon subscription criteria for subscriptions to the received events and to persist the watch list produced by the application of the rules into a database, the watch list generation module periodically according to a schedule accounting for changes in composition of the pool by repeating the pre-processing of the set of subscriptions to produce a new version of the watch list that is reflective of a contemporaneous state of the object pool while re-designated the watch list produced by the application of the rules in the database as a watch list for an old state of the pool that existed prior to the contemporaneous state of the object pool; and
the event loop loading the watch list, receiving events corresponding to different ones of the objects in the pool of objects, determining for each of the received events, a corresponding object for a corresponding one of the received events, and looking up in the old watch list an identifier of the corresponding object to the watch list for the old state, and if the identifier is not found in the old watch list, looking up in the new watch list the identifier so as to determine if the corresponding one of the received events pertains to an object referenced in either the old watch list or the new watch list, and for each one of the received events, forwarding a notification to one or more subscribers corresponding to an object in either of the watch lists matching an object implicated by the one of the received events so as to produce an occurrence of resource consumption resulting from the application of the subscription rules prior to the processing of the received events thereby permitting sequential processing of the received events without concurrent corresponding resource consumption.

2. The system of claim 1, wherein each entry in the watch list of objects corresponding to a particular one of the objects is assigned a key according to a hash of the particular one of the objects.

3. The system of claim 1, wherein an existing watch list persisted in the database is re-designated as an old watch list prior to persisting the produced watch list as a new watch list in the database.

4. A computer program product for watch list oriented processing of events in a multi-object event data processing system, the computer program product comprising:
a non-transitory computer readable storage medium comprising a device having computer readable program code embodied therewith, the computer readable program code comprising:
computer readable program code for executing an event loop in a host computing system and receiving events in the event loop;
computer readable program code for producing an occurrence of resource consumption resulting from an application of subscription rules prior to processing the received events in the event loop and permitting sequential processing of the received events in the event loop without concurrent corresponding additional resource consumption by:
computer readable program code for pre-processing prior to a receipt of events occurring in connection with different objects, a set of subscriptions against a pool of objects monitored for events in the data processing system by applying a set of subscription rules for different ones of the subscriptions to the objects in the pool before processing the received events, the application of the rules producing a watch list of objects and corresponding subscribers based upon subscription criteria for subscriptions to the received events;
computer readable program code for persisting the watch list produced by the application of the rules into a database;
computer readable program code for periodically according to a schedule accounting for changes in composition of the pool by repeating the pre-processing of the set of subscriptions to produce a new version of the watch list that is reflective of a contemporaneous state of the object pool while re-designated the watch list produced by the application of the rules in the database as a watch list for an old state of the pool that existed prior to the contemporaneous state of the object pool;
computer readable program code for receiving events in the data processing system corresponding to different ones of the objects in the pool of objects;
computer readable program code for determining for each of the received events, a corresponding object for a corresponding one of the received events, and looking up in the old watch list an identifier of the corresponding object to both the watch list for the old state, and if the identifier is not found in the old watch list, looking up in the new watch list the identifier so as to determine if the corresponding one of the received events pertains to an object referenced in either the old watch list or the new watch list; and,
computer readable program code for forwarding for each one of the received events, a notification to one or more subscribers corresponding to an object in either of the watch lists matching an object implicated by the one of the received events so as to produce an occurrence of resource consumption resulting from the application of the subscription rules prior to the processing of the received events thereby permitting sequential processing of the received events without concurrent corresponding resource consumption.

5. The computer program product of claim 4, wherein each entry in the watch list of objects corresponding to a particular one of the objects is assigned a key according to a hash of the particular one of the objects.

6. The computer program product of claim 4, further comprising computer readable program code for re-designating an existing watch list persisted in the database as an old watch list prior to persisting the produced watch list as a new watch list in the database.

* * * * *